US008998305B2

(12) United States Patent
Obata et al.

(10) Patent No.: US 8,998,305 B2
(45) Date of Patent: Apr. 7, 2015

(54) AUTOMOTIVE REAR VEHICLE BODY STRUCTURE

(71) Applicant: Mazda Motor Corporation, Hiroshima (JP)

(72) Inventors: Satoshi Obata, Hiroshima (JP); Mitsuaki Kitamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/344,594

(22) PCT Filed: Nov. 7, 2012

(86) PCT No.: PCT/JP2012/007127
§ 371 (c)(1),
(2) Date: Mar. 12, 2014

(87) PCT Pub. No.: WO2013/069268
PCT Pub. Date: May 16, 2013

(65) Prior Publication Data
US 2014/0339856 A1 Nov. 20, 2014

(30) Foreign Application Priority Data
Nov. 7, 2011 (JP) .................................. 2011-243030

(51) Int. Cl.
*B60N 99/00* (2006.01)
*B62D 21/11* (2006.01)
(52) U.S. Cl.
CPC ...................................... *B62D 21/11* (2013.01)
(58) Field of Classification Search
USPC ................ 296/193.08, 203.04; 180/311, 312; 280/124.109, 124.134, 124.135, 781
See application file for complete search history.

(56) References Cited

U.S. PATENT DOCUMENTS

| 5,562,308 | A | 10/1996 | Kamei et al. |
| 7,188,893 | B2 * | 3/2007 | Akasaka ........................ 296/204 |
| 2004/0080188 | A1 * | 4/2004 | Igarashi et al. .......... 296/203.04 |
| 2006/0061142 | A1 * | 3/2006 | Kobayashi et al. ...... 296/203.04 |
| 2006/0197300 | A1 * | 9/2006 | Nakashima et al. ... 280/124.109 |
| 2007/0187994 | A1 * | 8/2007 | Yasuhara et al. .......... 296/203.04 |
| 2008/0252104 | A1 * | 10/2008 | Yamaguchi et al. ...... 296/203.04 |
| 2009/0195030 | A1 * | 8/2009 | Yamaguchi et al. ...... 296/193.08 |
| 2009/0243272 | A1 | 10/2009 | Tanaka et al. |

FOREIGN PATENT DOCUMENTS

| JP | 02-048486 U | 4/1990 |
| JP | 02-098074 U | 8/1990 |

(Continued)

OTHER PUBLICATIONS

International Search Report; PCT/JP2012/007127; Feb. 19, 2013.

*Primary Examiner* — Lori L Lyjak
(74) *Attorney, Agent, or Firm* — Studebaker & Brackett PC

(57) ABSTRACT

Disclosed is an automotive rear vehicle body structure which comprises a rear subframe (21) provided with right and left side member segments (22). Each of the right and left side member segments (22) has a rear region provided with a rear fixing section (26) attached to a respective one of right and left rear side frames (7), and a front region provided with a front fixing section (25) attached to a vehicle-body cross member (10). A position of the front fixing section (25) of each of the side member segments (22) is set to be located inward of the respective one of the rear side frames (7) in a vehicle width direction, and each of the side member segments (22) is provided with an arm support section (28) configured to pivotally support a suspension arm (32), at a position rearward of the front fixing section (25).

7 Claims, 19 Drawing Sheets

(56) References Cited

FOREIGN PATENT DOCUMENTS

| | | |
|---|---|---|
| JP | 07-156824 A | 6/1995 |
| JP | 08-058615 A | 3/1996 |
| JP | 2000-272314 A | 10/2000 |
| JP | 2003-002233 A | 1/2003 |
| JP | 2009-255902 A | 11/2009 |
| JP | 2010-247622 A | 11/2010 |

\* cited by examiner

AUTOMOTIVE REAR VEHICLE BODY STRUCTURE

TECHNICAL FIELD

The present invention relates to an automotive rear vehicle body structure comprising a rear subframe having right and left side member segments and front and rear cross member segments.

BACKGROUND ART

Generally, a rear subframe (having the same meaning as "rear suspension cross member") for supporting a rear suspension has right and left side member segments and front and rear cross member segments. As an automotive rear vehicle body structure comprising such a rear subframe, there have been known various structures as illustrated in FIGS. 16 to 20.

A conventional structure (Patent Document 1) schematically illustrated in FIG. 16 in the form of a bottom view comprises a subframe 80 having right and left side member segments 81, 81 and front and rear cross member segments 82, 83, wherein front and rear fixing sections 81*a*, 81*b* provided in respective front and rear regions of each of the right and left side member segments 81, 81 are coupled to a respective one of rear side frames 84, 84, and a front portion 81*c* of each of the right and left side member segments 81, 81 is coupled to a vehicle-body cross member 85 through a respective one of extension members 86, 86.

In FIG. 16, the side member segment 81 is curved inwardly in a vehicle width direction to have an approximately circular arc shape, in top plan view. This curved structure is intended to ensure an installation space for a suspension spring in order to support the suspension spring by a base of the rear side frame 84, and to increase an arm length to suppress a change in suspension geometry (change in toe angle, etc.) due to an up-and-down movement of a rear wheel 87.

In FIG. 16, the reference code 88 indicates a front lower arm, and the reference code 89 indicates a rear lower arm. Further, in the figures, the arrowed line F indicates a vehicle forward direction, and the arrowed line R indicates a vehicle rearward direction.

The conventional structure illustrated in FIG. 16 has the following problems.

First, a distance between the front and rear fixing sections 81*a*, 81*b* of the side member segment 81 is relatively long and curved. Thus, in order to ensure rigidity against an input of lateral force, it is necessary to increase a plate thickness of the side member segment 81, resulting in an increase in weight.

Further, in the event of a rear collision, a rear impact load received by a rear region of the rear side frame 84 is concentrated on a front region of the rear side frame 84, as indicated by the arrowed line in FIG. 16. This causes a problem of an increase in amount of deformation in members around a side sill located forward of the rear side frame 84.

Besides, a distance between the front fixing section 81*a* and a support section 88*a* for the front lower arm 88 is relatively long, which is disadvantageous in terms of rigidity.

Moreover, the front portion 81*c* of the side member segment 81 is connected to the vehicle-body cross member 85 through the extension member 86, so that rigidity of the subframe 80 is enhanced somewhat. However, an increase in length of the extension member 86 gives rise to a problem of causing the extension member 86 to more easily undergo deformation, and of increases in required installation space and weight of the extension member 86.

A conventional structure (Patent Document 2) schematically illustrated in FIG. 17 in the form of a bottom view comprises a subframe 80A having right and left side member segments 81, 81 and front and rear cross member segments 82, 83, wherein front and rear fixing sections 81*a*, 81*b* provided in respective front and rear regions of each of the right and left side member segments 81, 81 are coupled to rear side frames 84, 84. Further, the side member segment 81 is formed to be curved inwardly in a vehicle width direction to have an approximately circular arc shape, in top plan view, for the same purpose as that of the conventional structure in FIG. 16.

In FIG. 17, each of the side member segments 81, 81 is formed to be curved inwardly in the vehicle width direction, and the front fixing section 81*a* is coupled to the rear side frame 84. Thus, a front region of the subframe 80A is strongly supported by the rear side frame 84 which is a vehicle-body strength member extending in a front-rear direction, and the side member segment 8 becomes more likely to undergo deformation. This has been considered to be desirable in terms of coupling strength between the subframe 80A and a vehicle body and further in terms of suppression of a forward displacement of the subframe 80A during a rear collision.

However, as with the conventional structure in FIG. 16, the conventional structure illustrated in FIG. 17 is incapable of shortening a distance between the front fixing section 81*a* and a support section 88*a* for the front lower arm 88, which is disadvantageous in terms of rigidity.

As above, except for the point about the extension member 86, the conventional structure illustrated in FIG. 17 has the same problem as those in the conventional structure in FIG. 16. In FIG. 17, the same element or component as that in FIG. 16 is assigned with the same reference numeral or code.

A conventional structure (Patent Document 3) schematically illustrated in FIG. 18 in the form of a bottom view comprises a subframe 90 having right and left side member segments 81, 81 and front and rear cross member segments 82, 83, wherein: each of the side member segments 81, 81 is configured such that a front fixing section 81*a* thereof is coupled to a vehicle-body cross member 85, and a rear end of each of the side member segments 81 is welded and fixed to the rear cross member segment 83; and fixing sections 83*b*, 83*b* provided at respective opposite ends of the rear cross member segment 83 are coupled, respectively, to rear side frames 84, 84.

In the conventional structure illustrated in FIG. 18, each of front and rear ends of the side member segment 81 having a crank-like shape is located spaced apart from the rear side frame 84, inwardly in a vehicle width direction. Thus, during input of a rear impact load into the rear side frame 84, the rear impact load is transmitted to the vehicle-body cross member 85 via the crank-like shaped side member segment 81. However, the rear end of the side member segment 81 is not directly coupled to the rear side frame 84, which is disadvantageous in terms of distribution of a rear impact load.

Moreover, a distance between the front fixing section 81*a* and a support section 88*a* for a front lower arm 88 is relatively long, which is disadvantageous in terms of rigidity. In FIG. 18, the same element or component as that in FIG. 16 is assigned with the same reference numeral or code.

A conventional structure schematically illustrated in FIG. 19 in the form of a bottom view comprises a subframe 91 having right and left side member segments 81, 81 and front and rear cross member segments 82, 83, wherein fixing sections 82*a*, 82*a* provided at respective opposite ends of the front cross member segment 82 are coupled, respectively, to rear side frames 84, 84, and fixing sections 83*a*, 83*a* provided at respective opposite ends of the rear cross member segment 83 are coupled, respectively, to the rear side frames 84, 84.

In the conventional structure illustrated in FIG. 19, in the event of a rear collision, a rear impact load received by a rear region of the rear side frame 84 is concentrated on a front region of the rear side frame 84, as indicated by the arrowed line in FIG. 19, which is disadvantageous in terms of distribution of the rear impact load. Moreover, a distance between the front fixing section 82*a* and a support section 88*a* for the front lower arm 88 is relatively long, which is disadvantageous in terms of rigidity. In FIG. 19, the same element or component as that in FIGS. 16 to 18 is assigned with the same reference numeral or code.

A conventional structure schematically illustrated in FIG. 20 in the form of a bottom view comprises a subframe 92 having right and left side member segments 81, 81 and front and rear cross member segments 82, 83, wherein fixing sections 82*a*, 82*a* provided at respective opposite ends of the front cross member segment 82 are coupled, respectively, to rear side frames 84, 84, and fixing sections 81*b*, 81*b* provided at respective rear ends of the right and left rear side member segments 81, 81 are coupled, respectively, to the rear side frames 84, 84.

In the conventional structure illustrated in FIG. 20, in the event of a rear collision, a rear impact load received by a rear region of the rear side frame 84 is concentrated on a front region of the rear side frame 84, as indicated by the arrowed line in FIG. 20, which is disadvantageous in terms of distribution of the rear impact load. Moreover, a distance between the front fixing section 82*a* and a support section 88*a* for the front lower arm 88 is relatively long, which is disadvantageous in terms of rigidity. In FIG. 20, the same element or component as that in FIGS. 16 to 19 is assigned with the same reference numeral or code.

LIST OF PRIOR ART DOCUMENTS

Patent Documents

Patent Document 1: JP 2010-247622A
Patent Document 2: JP 2009-255902A
Patent Document 3: JP 2000-272314A

SUMMARY OF THE INVENTION

The present invention has been made in view of the above circumstances, and an object thereof is to provide an automotive rear vehicle body structure capable of achieving lighter weight and higher rigidity in a rear subframe, while ensuring an arm length thereof, and enhancing rear impact safety.

In order to achieve the above object, the present invention provides an automotive rear vehicle body structure which comprises: right and left rear side frames; a vehicle-body cross member mutually coupling the right and left rear side frames and defining a closed cross-section in cooperation with a vehicle-body floor panel; and a rear subframe for supporting a rear suspension. The rear subframe has right and left side member segments, and front and rear cross member segments each mutually coupling the right and left side member segments. Each of the right and left side member segments has a rear region provided with a rear fixing section attached to a respective one of the right and left rear side frames, and a front region provided with a front fixing section attached to the vehicle-body cross member. A position of the front fixing section of each of the side member segments is set to be located inward of the respective one of the rear side frames in a vehicle width direction, and each of the side member segments is provided with an arm support section at a position rearward of the front fixing section, wherein the arm support section is configured to pivotally support a suspension arm of the rear suspension.

The present invention has an advantageous effect of being able to achieve lighter weight and higher rigidity in the rear subframe, while ensuring an arm length, and enhance rear impact safety.

DESCRIPTION OF EMBODIMENTS

Based on the drawings, one embodiment of the present invention will be described in detail.

Figure 1:
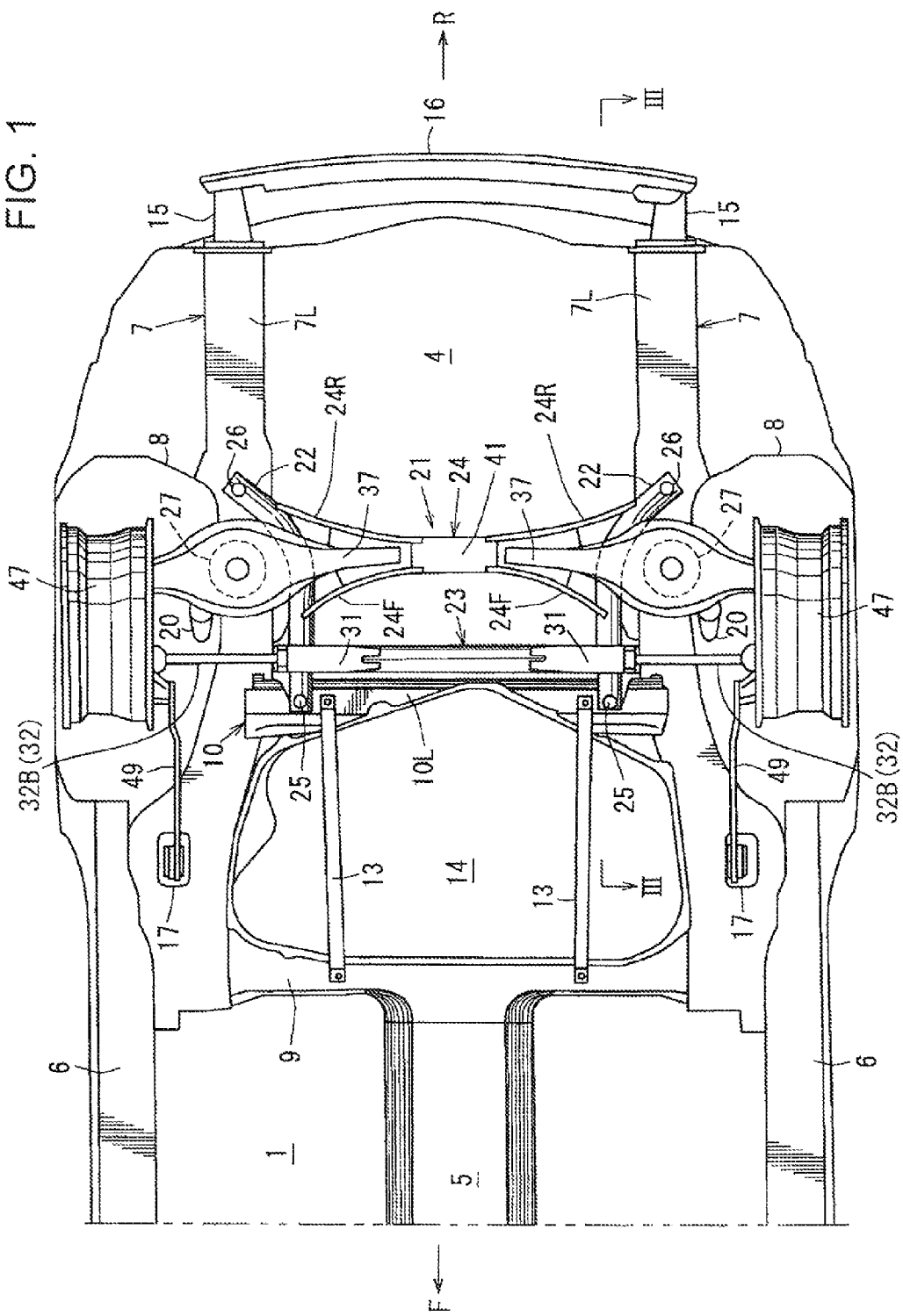
FIG. 1 is a bottom view illustrating an automotive rear vehicle body structure according to one embodiment of the present invention.
Figure 2:
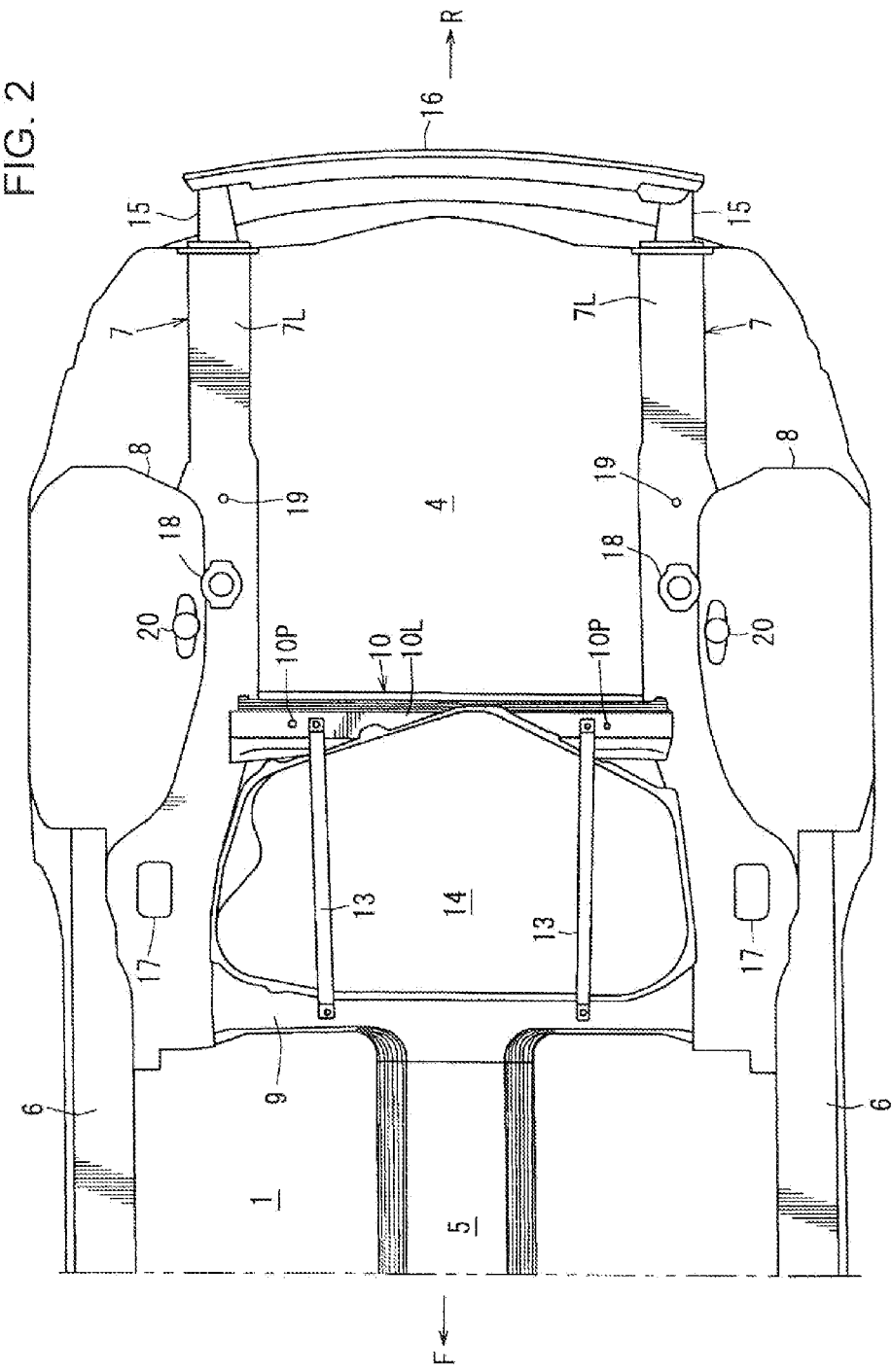
FIG. 2 is a bottom view of a state in which a rear subframe and a suspension arm are removed from the automotive rear vehicle body structure in FIG. 1.
Figure 3:
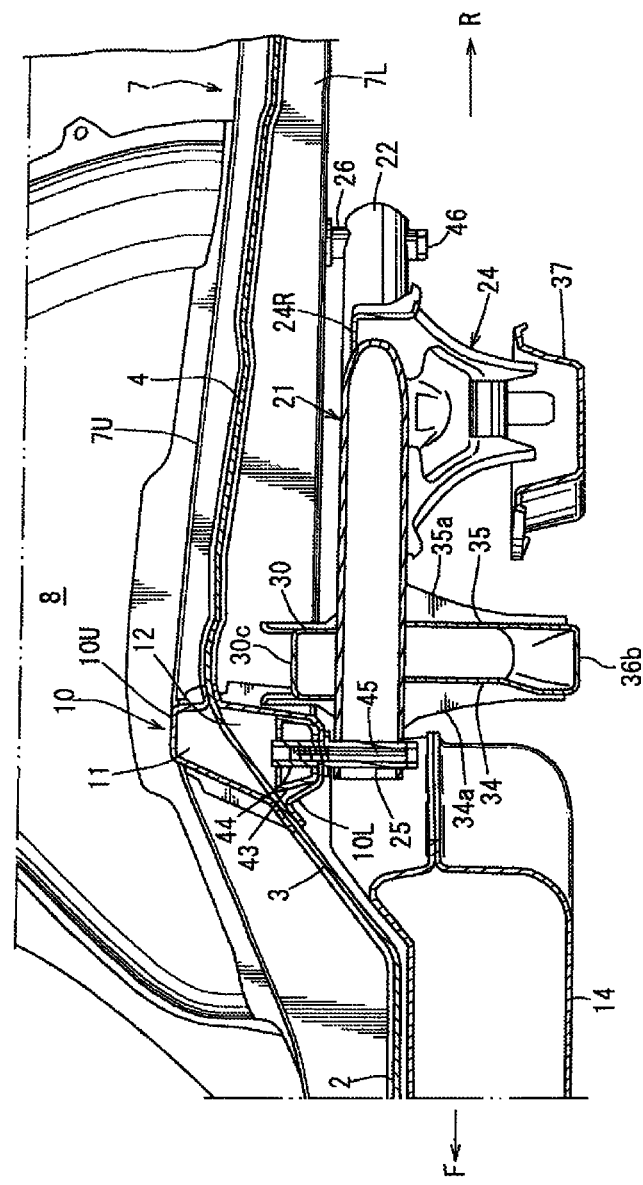
FIG. 3 is a sectional view taken along the arrowed line III-III in FIG. 1.

FIG. 1 is a bottom view illustrating an automotive rear vehicle body structure according to one embodiment of the present invention, and FIG. 2 is a bottom view of a state in which a rear subframe and a suspension arm are removed from the automotive rear vehicle body structure in FIG. 1, and FIG. 3 is a sectional view taken along the arrowed line III-III in FIG. 1, wherein the arrowed line F indicates a forward direction of the vehicle, and the arrowed line R indicates a rearward direction of the vehicle.

As illustrated primarily in FIGS. 2 and 3, a rear seat pan 2 and a slant section 3 extending obliquely upwardly and rearwardly from a rear edge of the rear seat pan 2 are provided rearward of a center floor panel 1, and further a rear floor 4 is provided rearward of the slant section 3.

A tunnel section 5 is integrally formed with a vehicle-widthwise central region of a set of the center floor panel 1 and a non-illustrated front floor panel to protrude toward an inside of a passenger compartment and extend in a vehicle front-rear direction, and two side sills 6 are joined, respectively, to vehicle-widthwise opposite edges of the set of the center floor panel 1 and the front floor panel.

A fuel tank 14 is mounted to a bottom (vehicle-exterior surfaces) of the rear seat pan 2 and the slant section 3, using a pair of tank bands 13.

Each of the side sills 6 is formed by joining a side sill inner panel and a side sill outer panel together. Each of the side sills 6 is a vehicle-body strength member having a side sill closed cross-section extending in the vehicle front-rear direction.

Each of a pair of right and left rear side frames 7 is provided to extend over a set of the rear seat pan 2, the slant section 3 and the rear floor 4, in the vehicle front-rear direction.

The rear side frames 7 are provided, respectively, on right and left sides of the vehicle, and located inward of a pair of right and left wheel houses 8 in a vehicle width direction. Each of the rear side frames 7 comprises a rear side frame upper panel 7U located on the side of an upper surface of the set of the rear seat pan 2, the slant section 3 and the rear floor 4, and a rear side frame lower panel 7L located on the side of a lower surface of the set of the rear seat pan 2, the slant section 3 and the rear floor 4. A rear side closed cross-section extending in the vehicle front-rear direction is defined between each of the rear side frame upper panel 7U and the rear side frame lower panel 7L, and the set of the components 2, 3, 4.

Each of the rear side frames 7 is a vehicle-body strength member, and a front end of each of the rear side frames 7 is coupled to a respective one of the side sills 6, at a position of a so-called "kick-up section" (a region where an aftermentioned No. 3 cross member 9 is disposed). A No. 3 cross member 9 is disposed to extend in the vehicle width direction between the front ends (coupling portions with the respective side sills 6) of the right and left rear side frames 7, 7. A closed cross-section extending in the vehicle width direction is defined between the cross member 9 and a vehicle-body floor panel (the rear seat pan 2).

Further, a No. 4 cross member 10 is disposed to extend in the vehicle width direction between the right and left rear side frames 7. More specifically, opposite right and left ends of the No. 4 cross member 10 are attached, respectively, to intermediate regions of the rear side frames 7 in the front-rear direction corresponding to a rear end of the slant section 3. In this embodiment, the No. 4 cross member 10 is equivalent to "vehicle-body cross member" set forth in the appended claims.

The No. 4 cross member 10 comprises: a cross member upper panel 10U located on the side of an upper surface of the slant section 3 to couple the right and left rear side frame upper panels 7U together in the vehicle width direction, and a cross member lower panel 10L located on the side of a lower surface of the slant section 3 to couple the right and left rear side frame lower panels 7L together in the vehicle width direction. A closed cross-section 11 extending in the vehicle width direction is defined between the cross member upper panel 10U and the slant section 3, and a closed cross-section 12 extending in the vehicle width direction is defined between the cross member lower panel 10L and the slant section 3. The cross member lower panel 10L has two mounting points 10P each configured to allow an aftermentioned front fixing section 25 of each of side member segments 22 (see FIG. 1) to be mounted thereto at a position inward of a respective one of the rear side frames 7 in the vehicle width direction.

As illustrated in FIG. 2, a crush can 15 is attached to a rear end of each of the right and left rear side frames 7, and a bumper reinforcement 16 extending in the vehicle width direction is disposed between the right and left crash cans 15.

Each of the rear side frame lower panels 7L has a front region provided with a trailing arm mounting portion 17 configured to allow an aftermentioned trailing arm 49 (FIG. 1) to be mounted thereto at a position between the front and rear cross members 9, 10, and an intermediate region in the front-rear direction provided with a spring seat 18 configured to allow an aftermentioned suspension spring 27 (FIG. 1) to be mounted thereto at a position rearward of the No. 4 cross member 10. Each of the rear side frame lower panels 7L further has a mounting point 19P configured to allow an aftermentioned rear fixing section 26 of each of side member segments 22 (see FIG. 1) to be mounted thereto at a position rearward of the spring seat 18. Further, a suspension damper mounting portion 20 is provided in each of the wheel houses 8.

As illustrated in FIG. 1 in the form of a bottom view, a rear subframe 21 is mounted to a vehicle body structure illustrated in FIGS. 2 and 3, to support a rear suspension.

Figure 4:
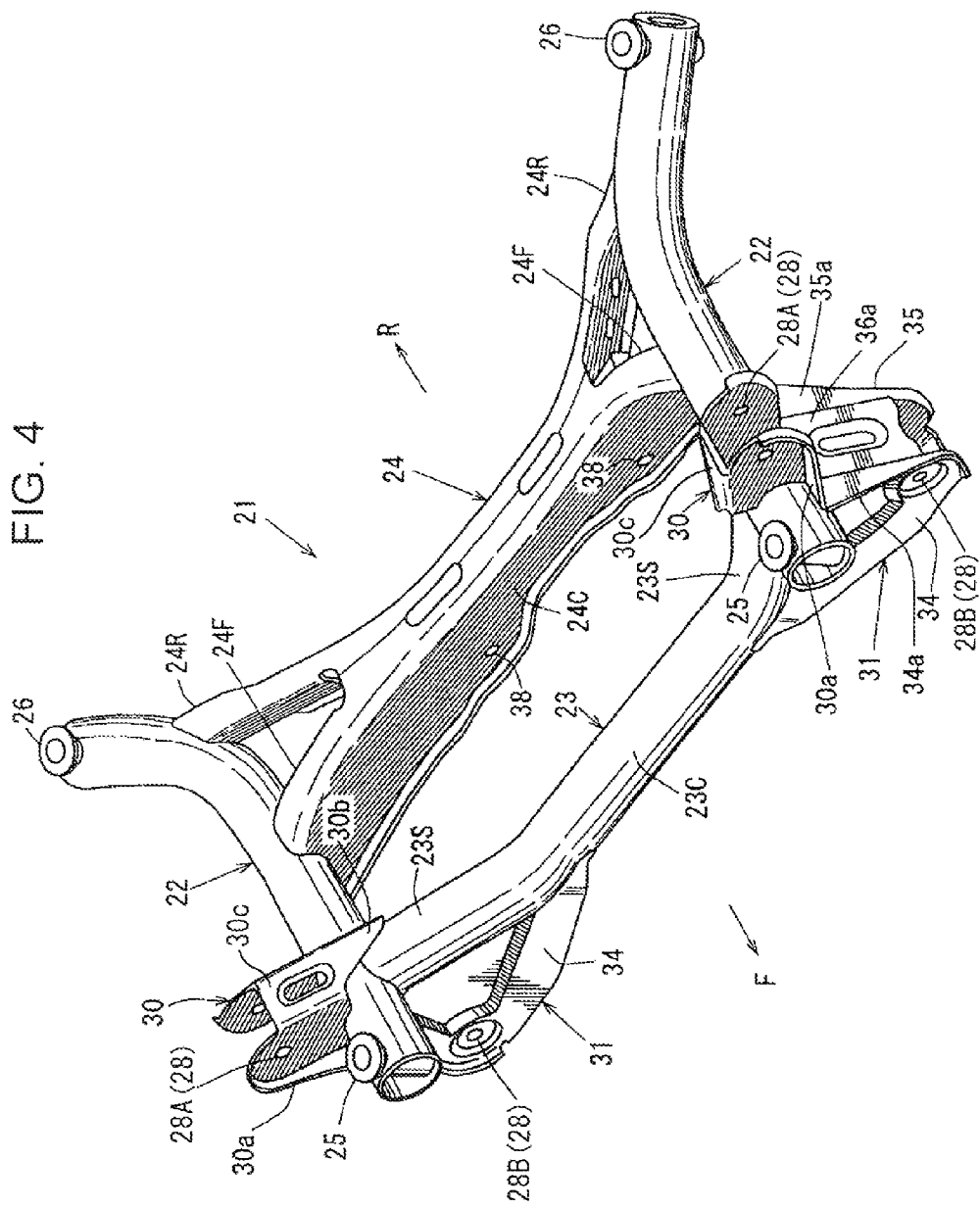
FIG. 4 is a perspective view of the rear subframe.
Figure 5:
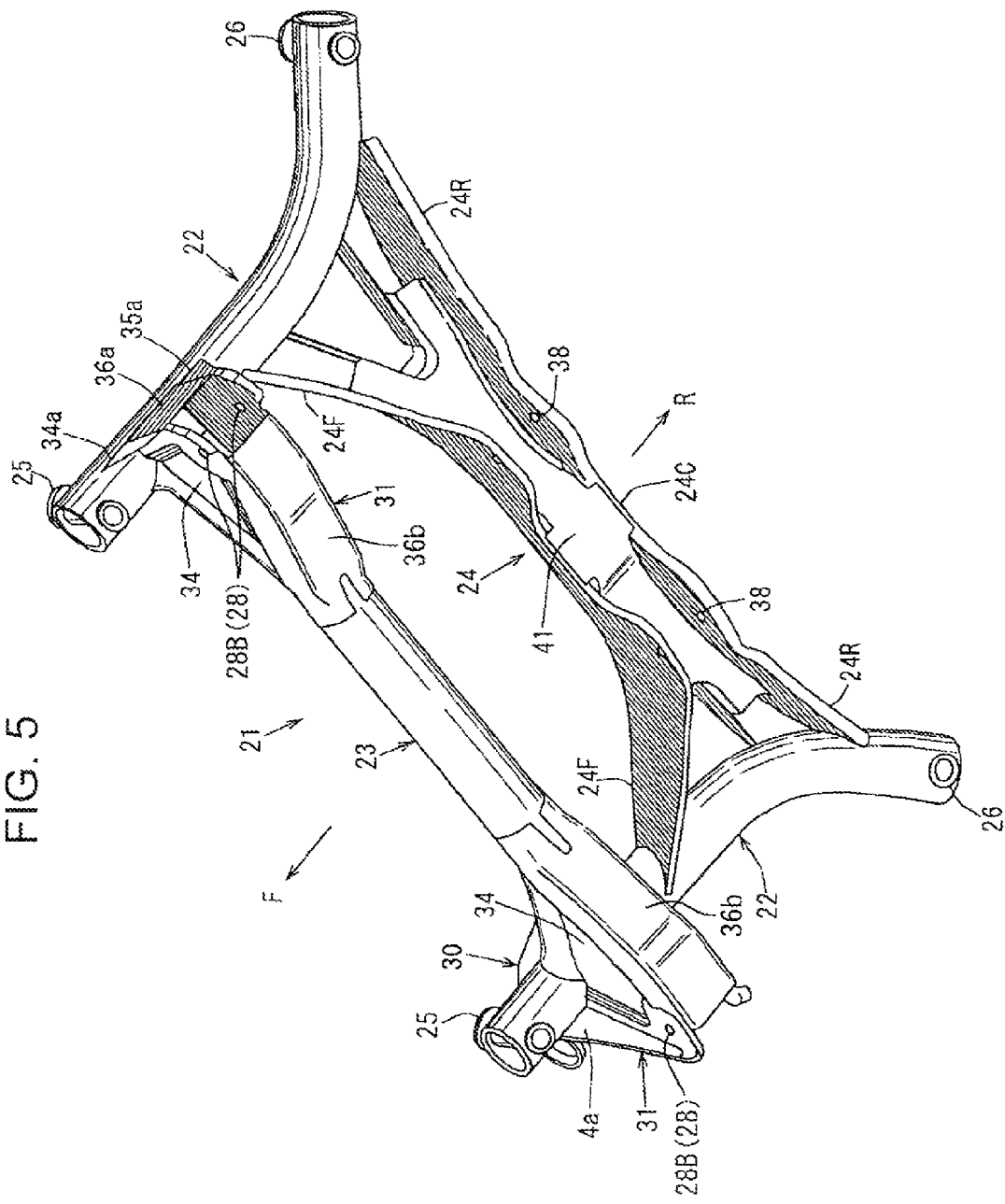
FIG. 5 is a perspective view of the rear subframe, when viewed obliquely upwardly from a lower side thereof.

FIG. 4 is a perspective view of the rear subframe 21, when viewed obliquely downwardly from an upper side thereof, and FIG. 5 is a perspective view of the rear subframe 21, when viewed obliquely upwardly from a lower side thereof. FIG. 6, FIG. 7, FIG. 8 and FIG. 9 are, respectively, a top plan view of the rear subframe 21, a front view of the rear subframe 21, a back view of the rear subframe 21, and a side view of the rear subframe 21.

As illustrated in FIGS. 4 to 9, the rear subframe 21 comprises: right and left side member segments 22; and a front cross member segment 23 and a rear cross member segment 24 each mutually coupling the side member segments 22.

Each of the right and left side member segments 22 is composed of a pipe-like shaped member. Each of the side member segments 22 has front and rear end regions provided, respectively, with a front fixing section 25 and a rear fixing section 26.

The front cross member segment 23 has right and left lateral portions 23S each extending inwardly in the vehicle width direction and downwardly from a respective one of the right and left side member segments 22, and a horizontal central portion 23C coupling the right and left lateral portions 23S together in the vehicle width direction. The entire front cross member segment 23 having this structure is composed of a pipe-like shaped member.

As illustrated in FIG. 1, a rear region of each of the right and left side member segments 22 is attached to a respective one of the right and left rear side frames 7 through the rear fixing section 26, and a front region of each of the right and left side member segments 22 is attached, through the front fixing section 25, to a respective one of light and left lateral portions of the No. 4 cross member 10 located inward of the respective one of the right and left rear side frames 7 in the vehicle width direction. More specifically, the rear fixing section 26 is attached to the mounting point 19 of the rear side frame lower panel 7L (FIG. 2), and the front fixing section 25 is attached to the mounting point 10P of the cross member lower panel 10L (FIG. 2).

As illustrated in FIG. 1, in order to ensure a space for installing a suspension spring 27, each of the side member segments 22 is partially formed into a curved shape. That is, each of the side member segments 22 has a region extending from the rear fixing section 26 thereof obliquely inwardly in the vehicle width direction and forwardly, to allow the suspension spring 27 to be installed forward of the oblique region.

Figure 11:
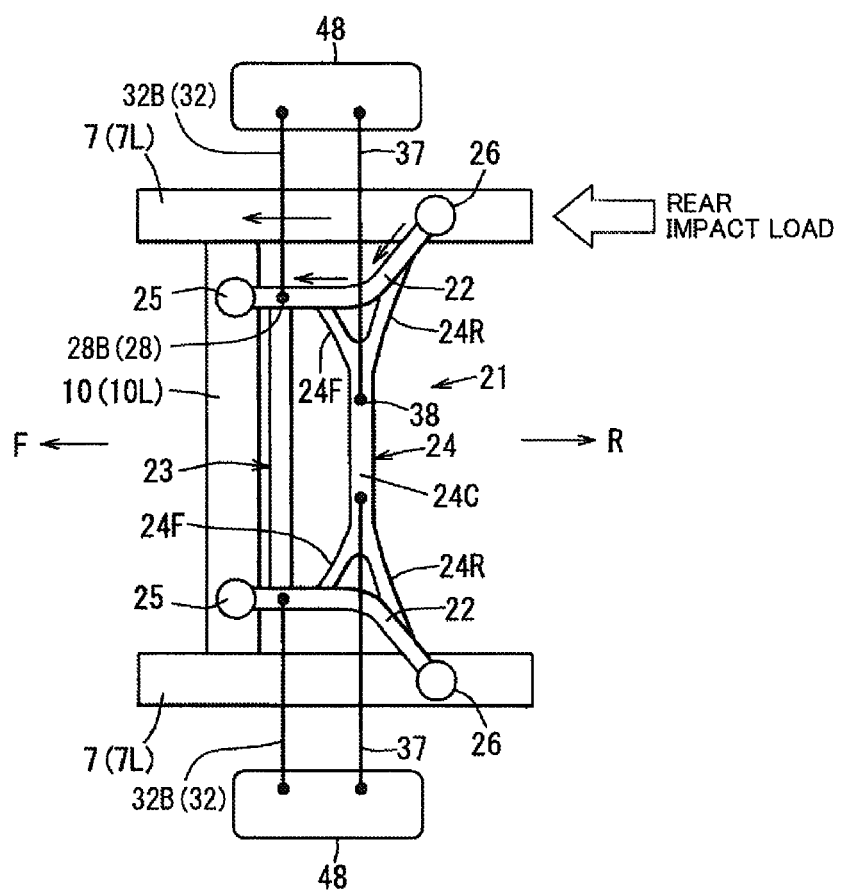
FIG. 11 is a bottom view schematically illustrating the automotive rear vehicle body structure.
Figure 12:
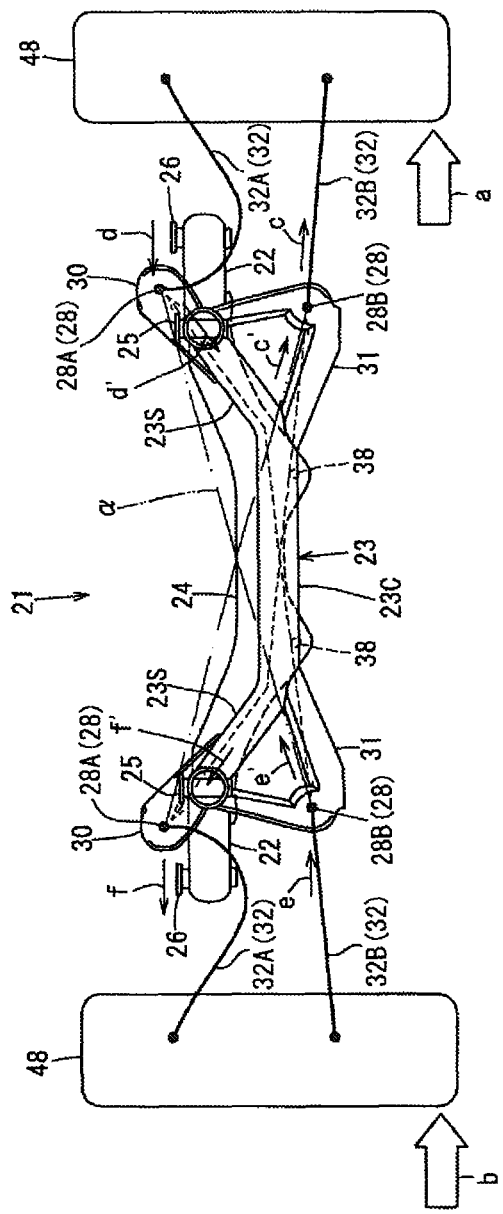
FIG. 12 is an explanatory diagram of an operation during input of same-phase lateral forces.
Figure 13:
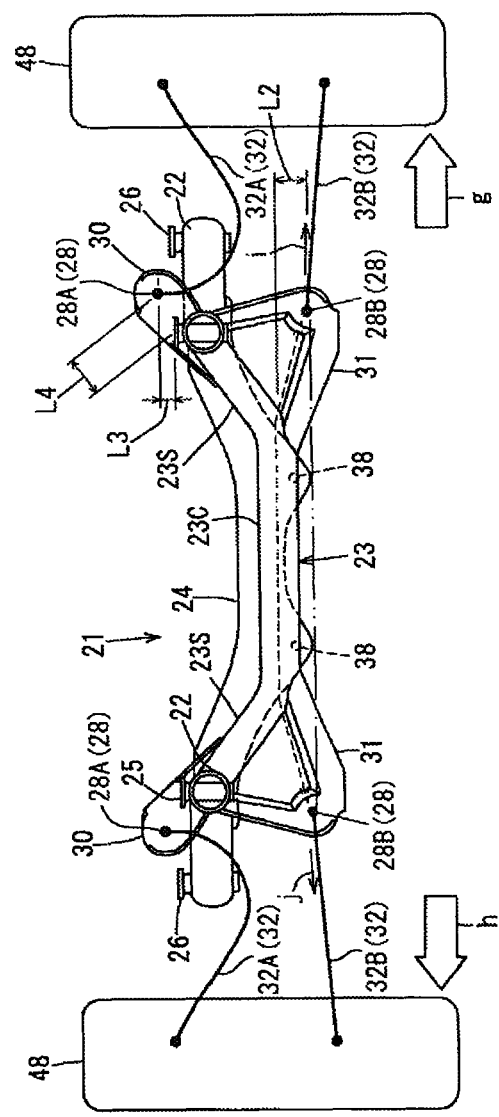
FIG. 13 is an explanatory diagram of an operation during input of different-phase lateral forces.

FIGS. 11 to 13 schematically illustrate the automotive rear vehicle body structure according to this embodiment. As illustrated in FIGS. 11 to 13 and FIG. 1, the rear suspension comprises: a front arm 32 consisting of an upper arm 32A and a lower arm 32B; a rear arm 37 located rearward of the lower arm 32B of the front arm 32; a suspension spring 27 composed of a coil spring; and a trailing arm 49.

Each of the front arm 32 (32A, 32B) and the rear arm 37 is provided to extend in the vehicle width direction to couple a rear wheel 48 (more specifically, a wheel support which is a mounting portion for a disc wheel 47 holding the rear wheel 48) and the rear subframe 21. The trailing arm 49 is provided to extend in the front-rear direction to couple the wheel support of the rear wheel 48 and the front region of the rear side frames 7. Based on functions of the arms 32 (32A, 32B), 37, 49 and others, an up-and-down movement of the rear wheel 48 is controlled.

In this embodiment, as illustrated in the bottom view of FIG. 11 and the front views of FIGS. 12 and 13, the upper arm 32A and the lower arm 32B of the front arm 32 are provided to extend in the vehicle width direction in approximately parallel relation. The upper arm 32A has a downwardly-concaved curved shape for avoiding interference with the rear side frame 7.

In this embodiment, as illustrated in FIG. 11 and FIG. 1, in order to ensure a toe-in (a toe angle in a state in which a front side of the rear wheel 48 is located inward in the vehicle width direction with respect to a rear side of the rear wheel 48), an arm length of the front arm 32 (each of the upper arm 32A and the lower arm 32B) is set to be less than an arm length of the rear arm 37. The term "arm length" here means a linear distance between vehicle-widthwise opposite ends of the arm (this also applies to the following description).

Further, in order to ensure a negative camber (a camber angle at which right and left rear wheels 48, 48 are arranged to form a truncated chevron shape), an arm length of the upper arm 32A is set to be less than an arm length of the lower arm 32B.

Figure 6:
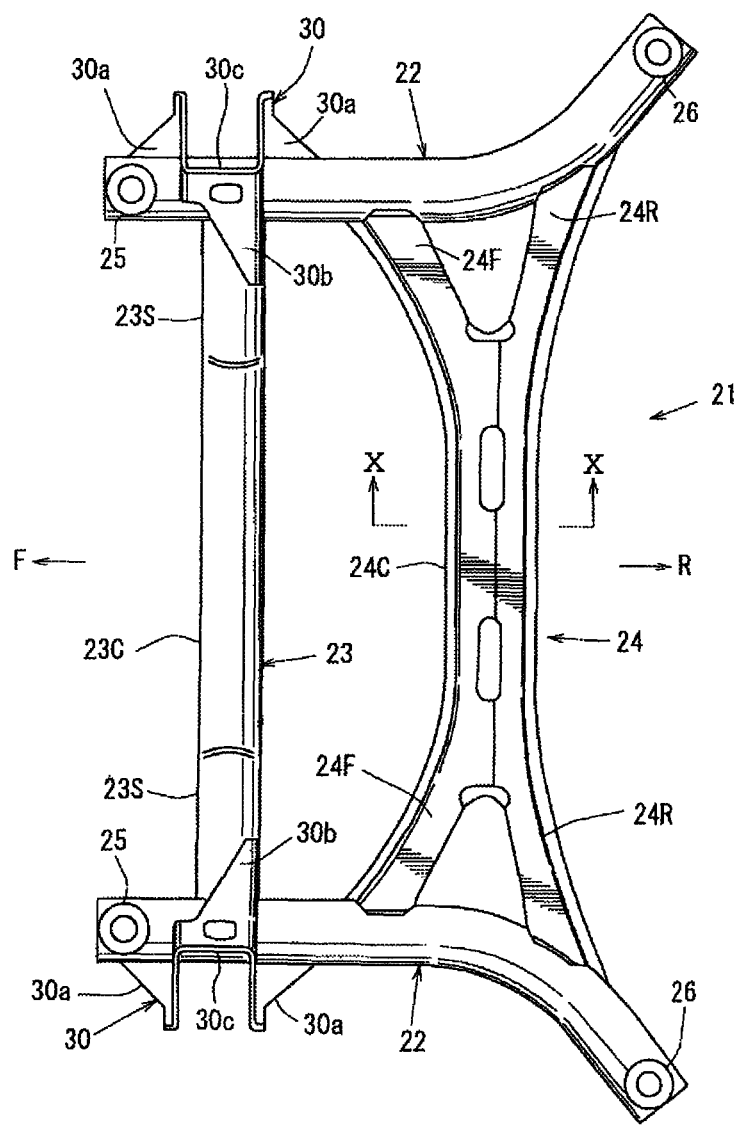
FIG. 6 is a top plan view of the rear subframe.

As illustrated in FIGS. 4 and 6, a front-arm support section 28 for pivotally supporting the front arm 32 is provided in the front region of each of the right and left side member segments 22 at a position rearward of the front fixing section 25. More specifically, the front-arm support section 28 has an upper-arm support sub-section 28A and a lower-arm support sub-section 28B at two positions spaced apart from each other in an up-down direction across a portion of the side member segment 22 adjacent to the front fixing section 25. Then, the upper arm 32A of the front arm 32 is pivotally supported by the upper-arm support sub-section 28A, and the lower arm 32B of the front arm 32 is pivotally supported by the lower-arm support sub-section 28B. In this embodiment, the front-arm support section 28 (28A, 28B) is equivalent to "arm support section" set forth in the appended claims, and the front arm 32 (32A, 32B) to be pivotally supported by the front-arm support section 28 is equivalent to "suspension arm" set forth in the appended claims.

In this embodiment, each of the upper-arm support sub-section 28A and the lower-arm support sub-section 28B is formed by a part of a bracket (aftermentioned brackets 30, 31) attached to each of the side member segments 22.

Figure 7:
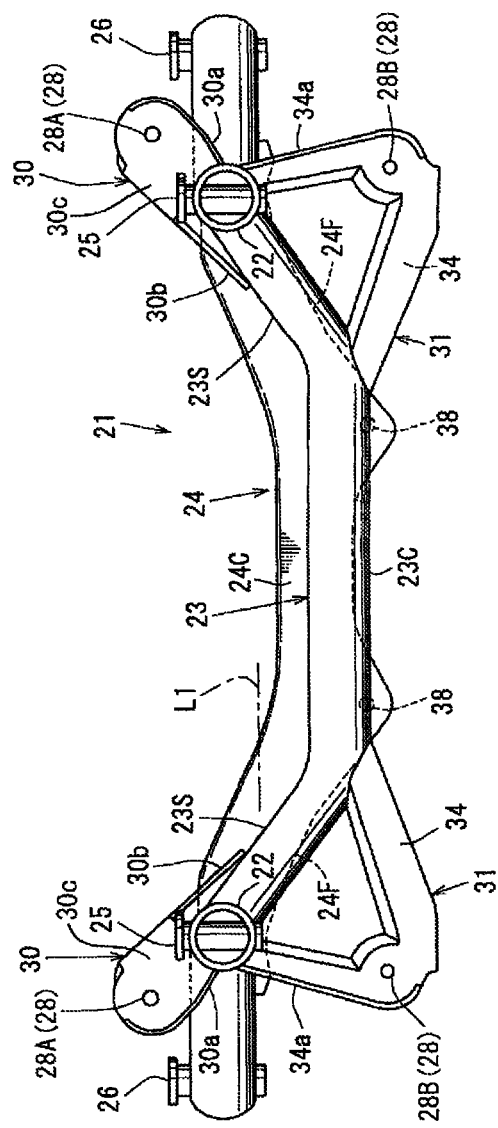
FIG. 7 is a front view of the rear subframe.
Figure 8:
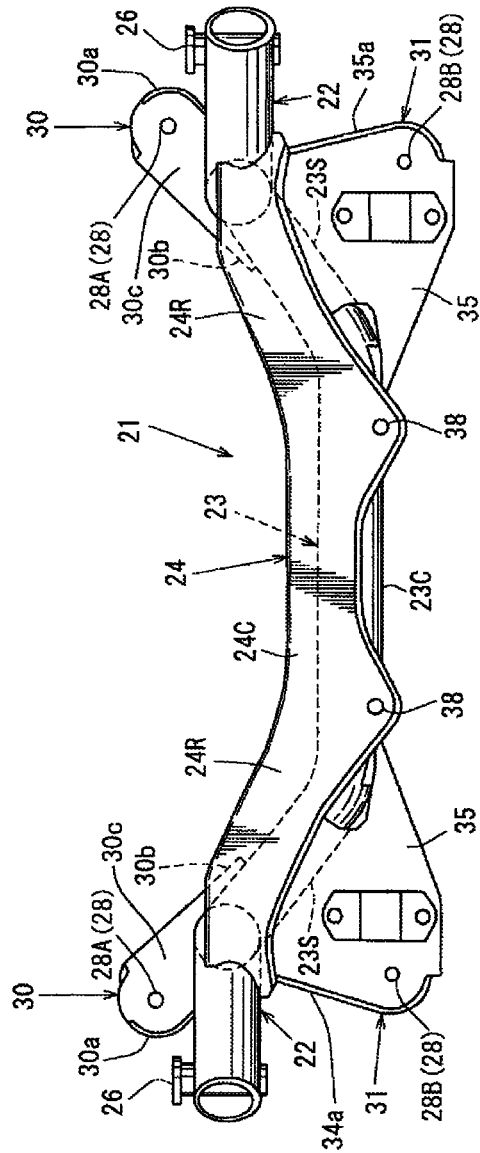
FIG. 8 is a back view of the rear subframe.

Specifically, as illustrated in FIGS. 4 and 7, an upper-arm support bracket 30 (hereinafter abbreviated and referred to simply as "the bracket 30") is attached to the side member segment 22 at a position rearward of the front fixing section 25, and the upper-arm support sub-section 28A is formed in the bracket 30. The bracket 30 is provided to extend along an extension line extending outwardly from the lateral portion 23S of the front cross member segment 23, i.e., provided to protrude outwardly in the vehicle width direction and upwardly from the side member segment 22.

Further, a lower-arm support bracket 31 (hereinafter abbreviated and referred to simply as "the bracket 31") extending outwardly in the vehicle width direction and downwardly is attached to the side member segment 22 at a position rearward of the front fixing section 25 and at approximately the same position in the front-rear direction as the bracket 30, and the lower-arm support sub-section 28B is formed in the bracket 31.

In FIG. 7, a middle position in the up-down direction between the upper-arm support sub-section 28A and the lower-arm support sub-section 28B is indicated by a virtual line L1. The vehicle-widthwise central portion 23C of the front cross member segment 23 is disposed downward of the middle position (virtual line L1) in the up-down direction between the upper-arm and lower-arm support sub-sections 28A, 28B.

As illustrated in FIGS. 6 to 9, the bracket 30 including the upper-arm support sub-section 28A comprises a base portion 30c having an angular-C shaped cross-section, a pair of flange portions 30a protruding oppositely from the base portion 30c in the front-rear direction, and an extension portion 30b extending inwardly in the vehicle width direction from the base portion 30c. Each of the base portion 30c and the front and rear flange portions 30a of the bracket 30 is joined to the side member segment 22, and the extension portion 30b is joined to an upper region of an adjacent one of the lateral portions 23S of the front cross member segment 23.

The use of the bracket 30 configured as above makes it possible to prevent tilting of the bracket 30 in the front-rear direction, and ensure sufficient joint strength against a lateral force.

As illustrated in FIGS. 4 to 9, the bracket 31 including the lower-arm support sub-section 28B comprises: a front panel 34 and a rear panel 35 each formed in an approximately triangular shape in front view and disposed in spaced-apart relation in the front-rear direction; and a side panel 36a and a lower panel 36b each mutually connecting the front and rear panels 34, 35 in the front-rear direction. The side panel 36a is provided to close an opening facing outwardly in the vehicle width direction between the front and rear panels 34, 35, and the lower panel 36b is provided to close an opening facing downwardly between the front and rear panels 34, 35.

Each of the front and rear panels 34, 35 is joined to a lower surface of the side member segment 22, and a lower surface of the front cross member segment 23 (specifically, a region of the lower surface from each of opposite right and left ends of the central portion 23C to a vehicle-widthwise outer end of each of the lateral portions 23S). Further, the front panel 34 is integrally formed with a forwardly-protruding flange portion 34a, and the rear panel 35 is integrally formed with a rearwardly-protruding flange portion 35a. Each of the flange portions 34a, 35a is joined to the side member segment 22. A joint width of the bracket 31 in the front-rear direction with respect to the side member segment 22 is increased by a length equal to those of the flange portions 34a, 35a.

The use of the bracket 31 configured as above makes it possible to prevent tilting of the bracket 31 in the front-rear direction, and ensure sufficient joint strength against a lateral force.

As above, in this embodiment, each of the side member segments 22 is provided with the brackets 30, 31 including the front-arm support section 28 (the upper-arm support sub-section 28A and the lower-arm support sub-section 28B), at a position rearward of the front fixing section 25, and the front arm 32 (the upper arm 32A and the lower arm 32B) of the rear suspension is pivotally supported by the front-arm support section 28. The bracket 30 including the upper-arm support sub-section 28A, the bracket 31 including the lower-arm support sub-section 28B, and the front cross member segment 23, are provided at approximately the same position of the side member segment 22 in the front-rear direction.

Figure 9:
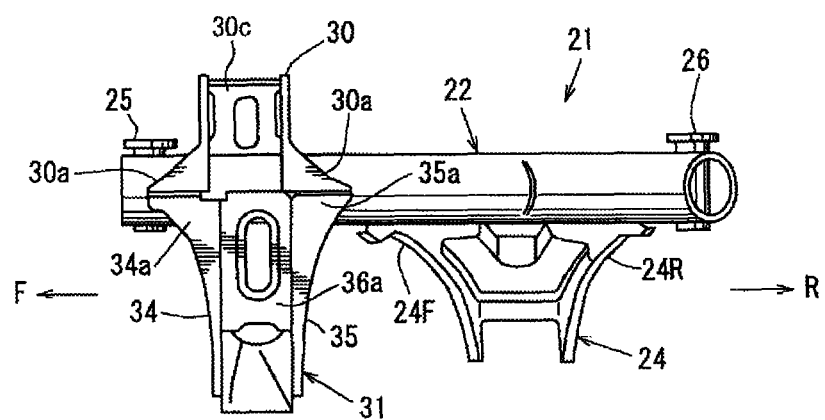
FIG. 9 is a side view of the rear subframe.

More specifically, positions of the brackets 30, 31 on the side member segment 22 are set to be located rearward of and fairly close to the front fixing section 25 of the side member segment 22. Particularly, as illustrated in FIGS. 4 and 9, in this embodiment, the brackets 30, 31 are arranged in adjacent relation to the front fixing section 25 in such a manner that the front flange portion 30a of the bracket 30 and the front flange portion 34a of the bracket 31 are located at the same position in the front-rear direction as that of the front fixing section 25. In this way, a distance in the front-rear direction between a set of the brackets 30, 31 including the front-arm support section 28 (28A, 28B) and the front fixing section 25 of the side member segment 22 is shortened to thereby enhance torsional rigidity of the rear subframe 21.

As illustrated in FIGS. 1, 3 and 11, the rear cross member segment 24 of the rear subframe 21 supports the rear arm 37, at a position spaced apart rearwardly from the front-arm support section 28 and the front cross member segment 23.

Specifically, as illustrated in FIGS. 4 to 9, the rear cross member segment 24 comprises: a central portion 24C located forward of each of the rear fixing sections 26 of the rear subframe 21; and a forwardly-inclined portion 24F and a rearwardly-inclined portion 24R each extending outwardly in the vehicle width direction from each of opposite right and left ends of the central portion 24C. The central portion 24C is provided with two rear arm support sections 38 at respective right and left portions thereof. The rear arms 37 of the rear suspension illustrated in FIGS. 1 and 3 are pivotally supported, respectively, by the right and left rear arm support sections 38.

The rearwardly-inclined portion 24R and the forwardly-inclined portion 24F of the rear cross member segment 24 are provided to be branched from each of the right and left ends of the central portion 24C in a forked manner. More specifically, the rearwardly-inclined portion 24R extends obliquely (outwardly in the vehicle width direction and rearwardly) toward the rear fixing section 26 of each of the side member segments 22, and the forwardly-inclined portion 24F extends obliquely in a direction opposite to that of the rearwardly-inclined portion 24R (outwardly in the vehicle width direction and forwardly). Vehicle-widthwise outer ends of the branched inclined portions 24R, 24F are joined to the side member segment 22, so that a so-called truss structure is formed by these three components: the side member segment 22, the forwardly-inclined portion 24F and the rearwardly-inclined portion 24R.

Figure 10:
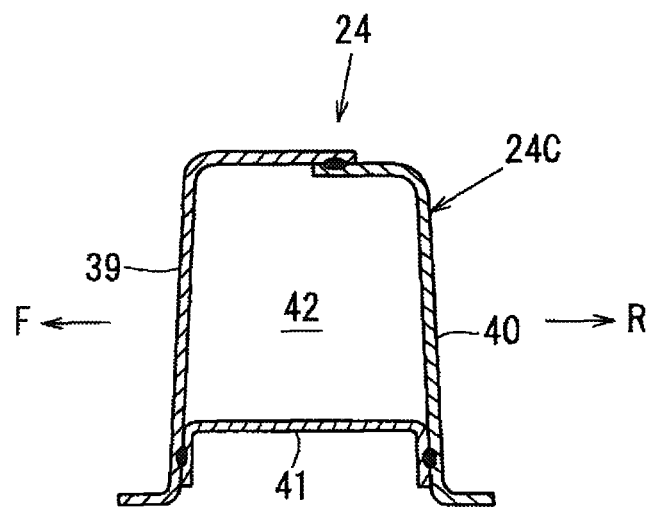
FIG. 10 is a sectional view taken along the arrowed line X-X in FIG. 6.

FIG. 10 is a sectional view taken along the arrowed line X-X in FIG. 6. As illustrated in FIG. 10, the rear cross member segment 24 is formed by joining a front member 39 composed of a plate bent into a reverse-L shape, and a rear member 40 composed of a plate bent into an L shape, together. Particularly, as represented by the cross-section in FIG. 10, the central portion 24C of the rear cross member segment 24 has a stiffner 41 joined to lower portions of the front and rear members 39, 40, so that a closed cross-section 42 extending in the vehicle width direction is defined by these three components (39, 40, 41). This closed cross-section structure makes it possible to enhance rigidity of the central portion 24C of the rear cross member segment 24.

Further, in this embodiment, as represented by the perspective view in FIG. 5, the stiffner 41 is provided not only in the central portion 24C but also a vehicle-widthwise midway position of the forwardly-inclined portion 24F and the rearwardly-inclined portion 24R. This makes it possible to enhance rigidity of each of the inclined portions 24F, 24R, thereby effectively further reinforcing the rear cross member segment 24 without casing any increase in the number of components.

As illustrated in FIG. 3, the front fixing section 25 of each of the side member segments 22 is fastened and fixed to a nut 44 supported inside the closed cross-section 12 of the cross member lower panel 10L by a reinforcement 43, from below, using a bolt 45. In the same manner, the rear fixing section 26 of the side member segment 22 is fastened and fixed to each of the rear side frame lower panels 7L from below, using a bolt 46.

Further, as illustrated in FIGS. 1 and 3, in order to additionally serve as a spring seat for the suspension spring 27, the rear arm 37 has a portion being expanded in the front-rear direction at a position vertically opposed to the spring seat 18 (see FIG. 2) of the rear side frame lower panel 7L.

Next, functions of the rear vehicle body structure according to the above embodiment illustrated in FIGS. 1 to 13 will be described. This vehicle body structure comprises: the right and left rear side frames 7; the No. 4 cross member 10 (vehicle-body cross member) mutually coupling the right and left rear side frames 7 and defining a closed cross-section in cooperation with the slant section 3 of the vehicle-body floor panel; and the rear subframe 21 for supporting a rear suspension. The rear subframe 21 has the right and left side member segments 22, and the front and rear cross member segments 23, 24 each mutually coupling the right and left side member segments 22. Each of the right and left side member segments 22 has a rear region provided with the rear fixing section 26 attached to a respective one of the right and left rear side frames 7, and a front region provided with the front fixing section 25 attached to the No. 4 cross member 10. A position of the front fixing section 25 of each of the side member segments 22 is set to be located inward of the respective one of the rear side frames 7 in the vehicle width direction, and each of the side member segments 22 is provided with the front-arm support section 28 (arm support section) at a position rearward of the front fixing section 25, wherein the front-arm support section 28 is configured to pivotally support the front arm 32 (suspension arm) of the rear suspension.

According to this feature, the front fixing section 25 of each of the right and left side member segments 25 is attached to the No. 4 cross member (i.e., a vehicle-body component member located inward of the rear side frames 7 in the vehicle width direction) mutually coupling the right and left rear side frames 7. Thus, as compared to a structure in which the front fixing section is attached to the rear side frame 7, a distance in the vehicle width direction between the front-arm support section 28 (the upper-arm support sub-section 28A and the lower-arm support sub-section 28B) and the front fixing section 25 provided in each of the side member segments 22 becomes shorter, and an arm length of the front arm 32 (the upper arm 32A and the lower arm 32B) becomes longer. This makes it possible to enhance rigidity of the rear subframe 21 without providing an additional member such as a reinforcing member, thereby achieving lighter weight and higher rigidity in the rear subframe 21. In addition, the arm length can be sufficiently ensured, so that it becomes possible to effectively prevent a change in suspension geometry (change in toe angle, etc.) due to an up-and-down movement of the rear wheel 48.

In the event of a vehicle rear collision, as indicated by the arrowed lines in FIG. 11, a rear impact load received by a rear region of the rear side frame 7 is transmitted to the No. 4 cross member 10 via the side member segment 22, and then distributed from the No. 4 cross member 10 to a member other than the rear side frame 7, such as a vehicle-body floor panel. In this way, the distribution of a rear impact load can be promoted, so that it becomes possible to suppress forward displacement of the rear subframe 21 and deformation of a vehicle-body member located forward of the rear subframe 21, due to the rear impact load, and further enhance rear impact safety.

Furthermore, the crush cans 15 and a member such as the rear floor 4, located rearward of the rear subframe 21 are reliably collapsed in advance of the high-rigidity rear subframe 21, so that it becomes possible to more effectively utilize a crush space in a rear of the vehicle body.

In the above embodiment, the rear cross member segment 24 comprises: the central portion 24C located forward of the rear fixing section 26 of each of the side member segments 22; the rearwardly-inclined portion 24R extending from the central portion 24C obliquely toward the rear fixing section 26 of the side member segment 22; and the forwardly-inclined portion 24F extending outwardly in the vehicle width direction and forwardly while being branched with respect to the rearwardly-inclined portion 24R. The central portion 24C of the rear cross member segment 24 is provided with the two rear arm support sections 38 at right and left portions thereof. The two rear arms 37 located rearward of the suspension arms 32 are pivotally supported, respectively, by the rear arm support sections 38.

According to this feature, a truss structure is formed by the three components: the rearwardly-inclined portion 24R and the forwardly-inclined portion 24F of the rear cross member segment 24, and the side member segment 22. The truss structure can efficiently reinforce the rear cross member segment 24 and thus the side member segment 22, so that it becomes possible to enhance support rigidity for the rear arm 37 in the front-rear direction and right-left direction while suppressing an increase in weight. In addition, a rear impact load can be effectively distributed to the No. 4 cross member 10 via the side member segment 22 reinforced by the truss structure.

In the above embodiment, each of the side member segments 22 has a region extending from the rear fixing section 26 thereof obliquely inwardly in the vehicle width direction and forwardly, to allow the rear suspension spring 27 to be installed forward of the oblique region.

According to this feature, it becomes possible to satisfy both of distribution of a rear impact load via the side member segment 22 and layout of the suspension spring 27.

In the above embodiment, each of the side member segments 22 is formed into a pipe-like shape.

According to this feature, each of the side member segments 22 has a pipe-like shape (closed cross-section structure), so that it becomes possible to further promote the achievement of lighter weight and higher rigidity in the rear subframe 21 and the distribution of a rear impact load.

In the above embodiment, the front arm 32 comprises the upper arm 32A, and the lower arm 32B located below the upper arm 32A. The front-arm support section 28 comprises the upper-arm support sub-section 28A configured to pivotally support the upper arm 32A, and the lower-arm support sub-section 28B configured to pivotally support the lower arm 32B. The upper-arm support sub-section 28A and the lower-arm support sub-section 28B are provided at approximately the same position in the front-rear direction.

In this way, the upper-arm support sub-section 28A and the lower-arm support sub-section 28B are provided at approximately the same position in the front-rear direction. In this case, it becomes possible to suppress a vehicle-widthwise bending moment applied to the side member segment 22 due to a lateral force, and prevent a undesirable change in suspension geometry, as compared to the case where they are different in terms of front-rear position.

Next, with reference to FIG. 12, an operation in a situation where same-phase lateral forces (lateral forces causing the right and left rear wheels 48, 48 to tilt in the same side) are input during turning of an automotive vehicle or the like will be described. In FIG. 12, the vehicle is viewed rearwardly from a front side thereof. Thus, a right side of the drawing corresponds to a left side of the vehicle, and a left side of the drawing corresponds to a right side of the vehicle.

When the same-phase lateral forces b, a are input, respectively, into the right and left rear wheels 48, 48, a pulling force c and a pushing force d are applied, respectively, to the left lower arm 32B and the left upper arm 32A, and a pushing force e and a pulling force f are applied, respectively, to the right lower arm 32B and the right upper arm 32A.

As is clear from FIG. 12, in the body structure according to the above embodiment, the bracket 30, the lateral portion 23S and the central portion 23C of the front cross member segment 23, and the bracket 31 connect generally along a straight line obliquely extending in a direction from a right upper region to a left lower region of the vehicle or from a left upper region to a right lower region of the vehicle. Thus, paths connecting between respective ones of the arm support sub-sections 28A, 28B on the left side and the arm support sub-sections 28B, 28A on the right side diagonally cross to form an X shape, so that oblique forces c', d', e', f indicated by the arrowed lines in FIG. 12 are applied from the brackets 30, 31 to the front cross member segment 23. Therefore, the left pulling force c' and the right pulling force f cancel each other out, and the right pushing force e' and the left pushing force d' cancel each other out, so that it becomes possible to cancel out the same-phase lateral forces. In FIG. 12, load transmission paths forming an ideal X shape are indicated by the virtual lines α.

Next, with reference to FIG. 13, an operation in a situation where different-phase lateral forces are input, respectively, into the right and left rear wheels 48, 48, for example, when vehicle acceleration or deceleration causes a toe-in state, or during traveling on tucks or bumpy road, will be described. In FIG. 13, the vehicle is viewed rearwardly from a front side thereof. Thus, a right side of the drawing corresponds to a left side of the vehicle, and a left side of the drawing corresponds to a right side of the vehicle.

When the different-phase lateral forces h, g are input, respectively, into the right and left rear wheels 48, 48, a pulling force i and a pulling force j are applied, respectively, to the left lower arm 32B and the right lower arm 32B.

As is clear from FIG. 13, in the body structure according to the above embodiment, an offset amount (distance L2) in the up-down direction between the central portion 23C of the front cross member segment 23 and the lower-arm support sub-section 28B is set to a relatively small value. That is, the central portion 23C of the front cross member segment 23 is disposed between the upper-arm support sub-section 28A and the lower-arm support sub-section 28B, at a position closer to the lower-arm support sub-section 28B. Further, each of an offset amount (distance L3) in the up-down direction and a linear distance L4 between the front fixing section 25 and the upper-arm support sub-section 28A of the side member segment 22 is also set to a relatively small value. This makes it possible to enhance rigidity of the brackets 30, 31 and the front cross member segment 23, and allow the relatively large pulling forces j, i input into the right and left lower arms 32B (pulling forces greater than loads input, respectively, into the right and left upper arms 32A) to cancel each other out via the central portion 23C of the front cross member segment 23, thereby cancelling out the different-phase lateral forces.

Figure 14:
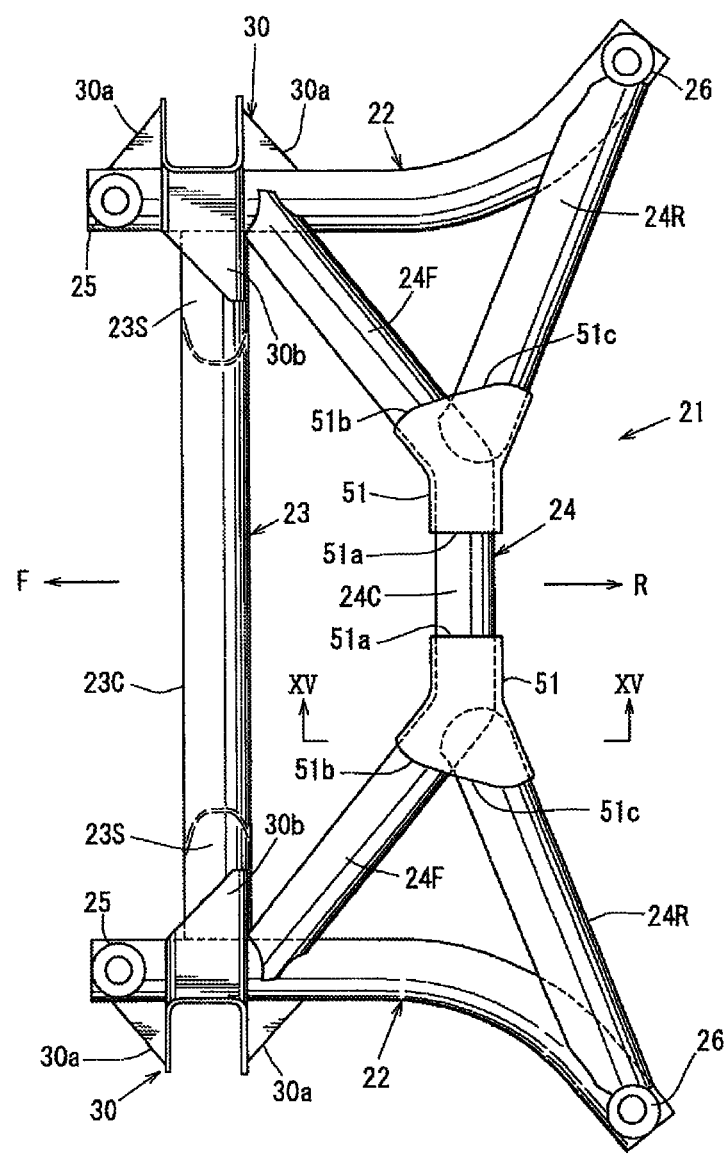
FIG. 14 is a top plan view illustrating an automotive rear vehicle body structure according to another embodiment of the present invention.
Figure 15:
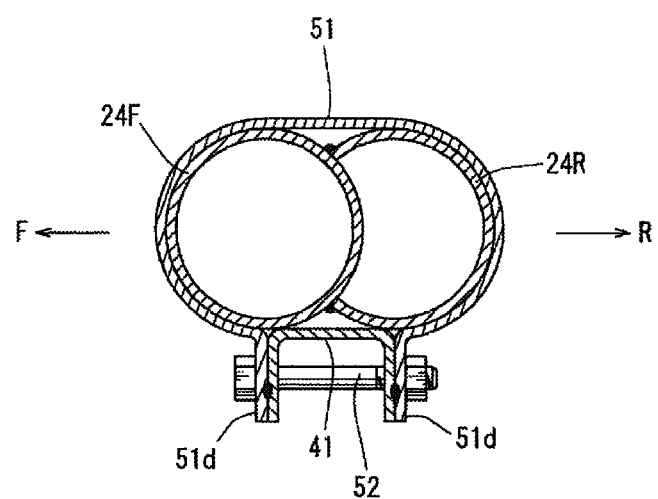
FIG. 15 is a sectional view taken along the arrowed line XV-XV in FIG. 14.
Figure 16:
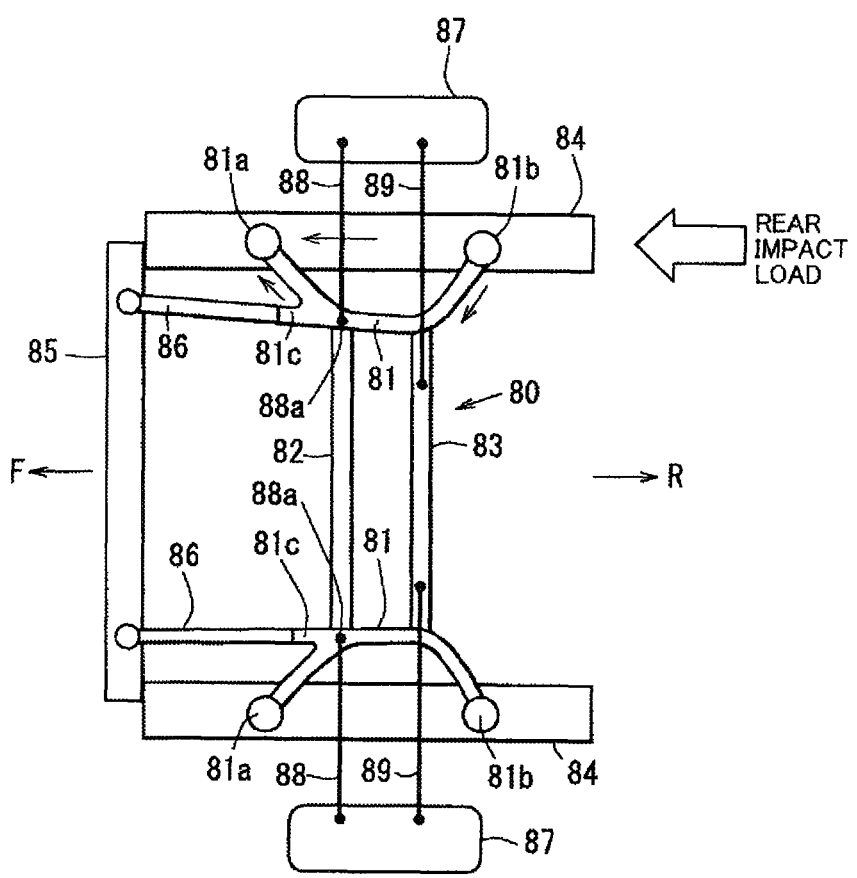
FIG. 16 is a bottom view schematically illustrating one example of a conventional automotive rear vehicle body structure.
Figure 17:
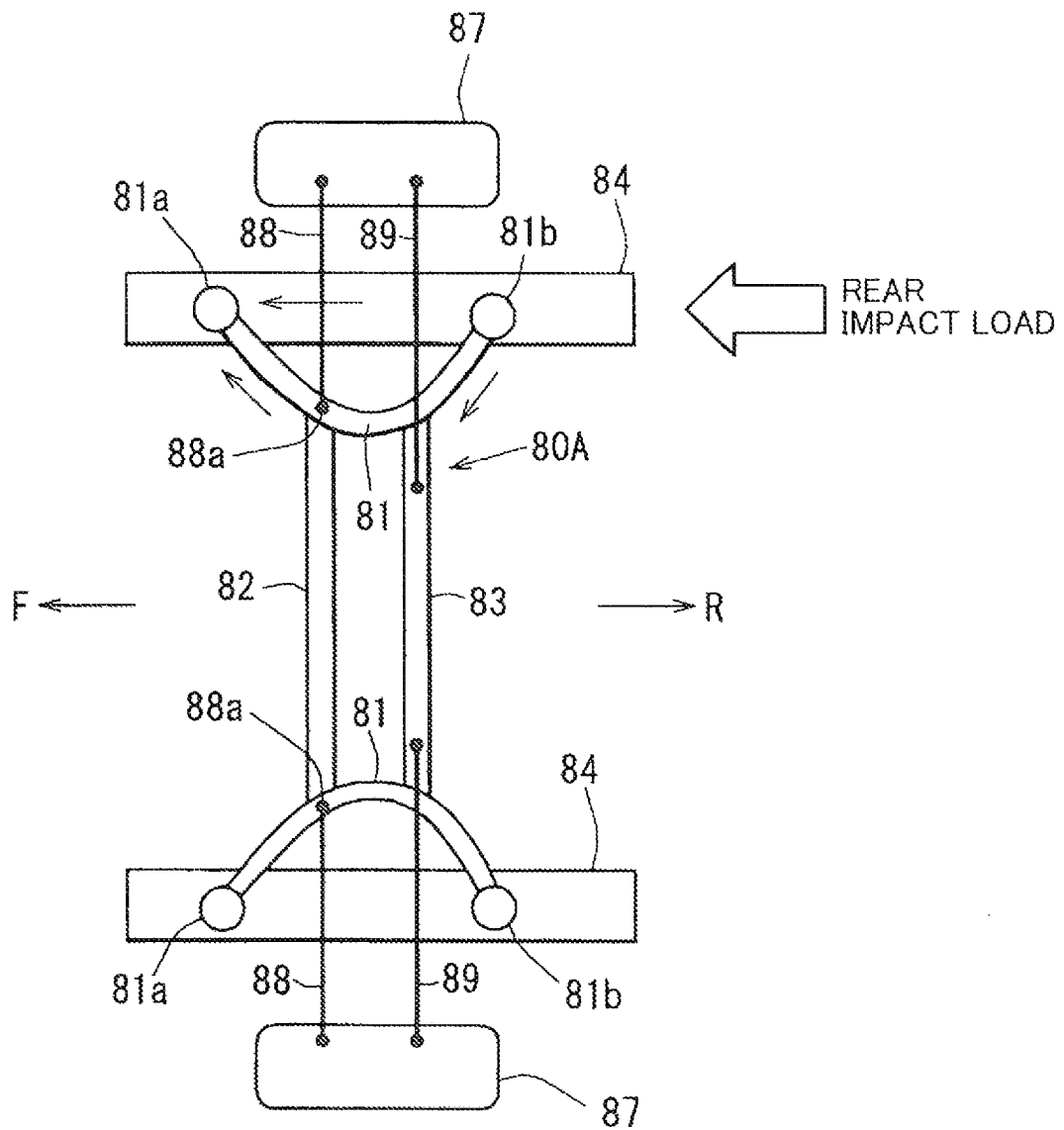
FIG. 17 is a bottom view schematically illustrating another example of the conventional automotive rear vehicle body structure.
Figure 18:
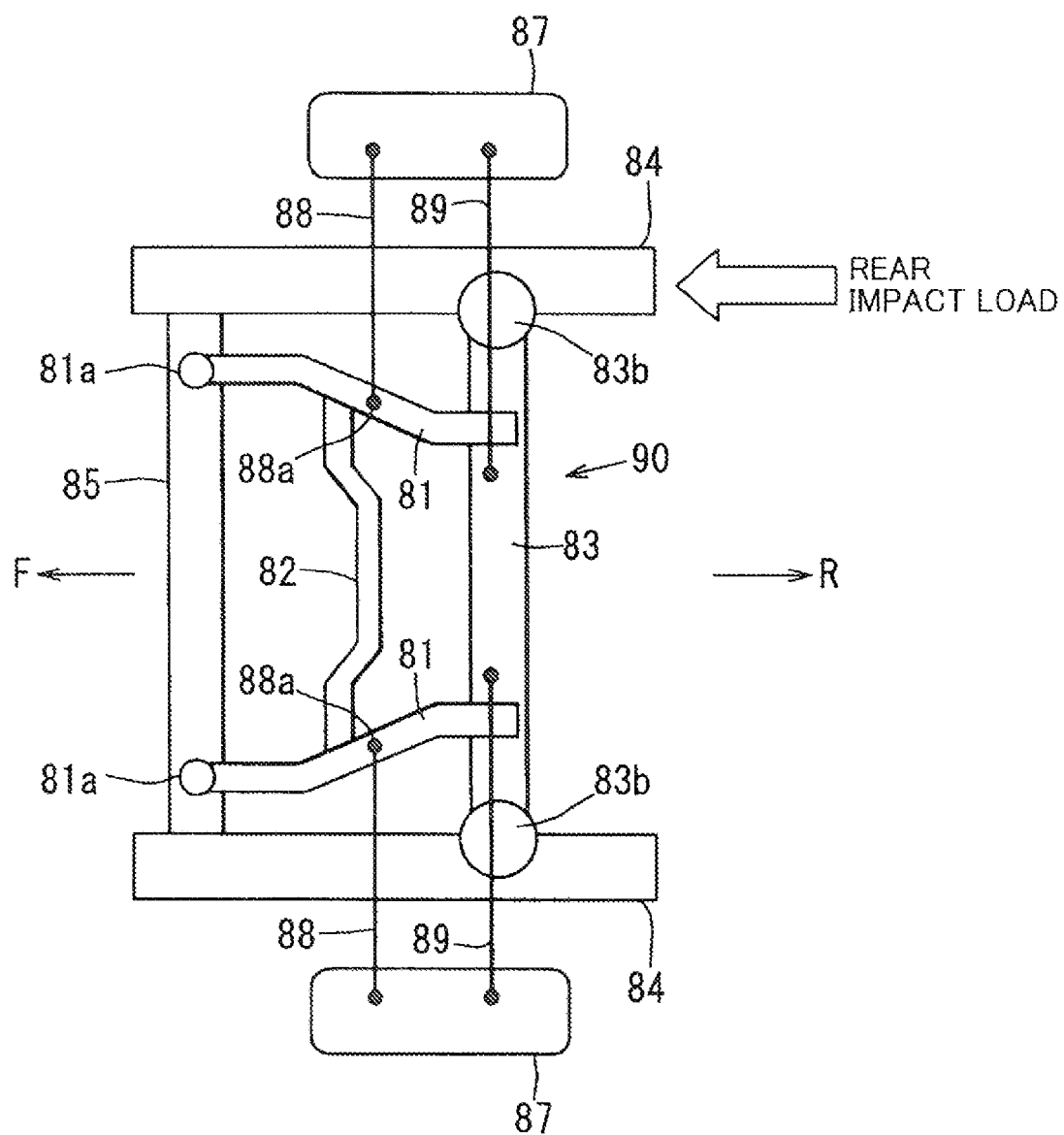
FIG. 18 is a bottom view schematically illustrating yet another example of the conventional automotive rear vehicle body structure.
Figure 19:
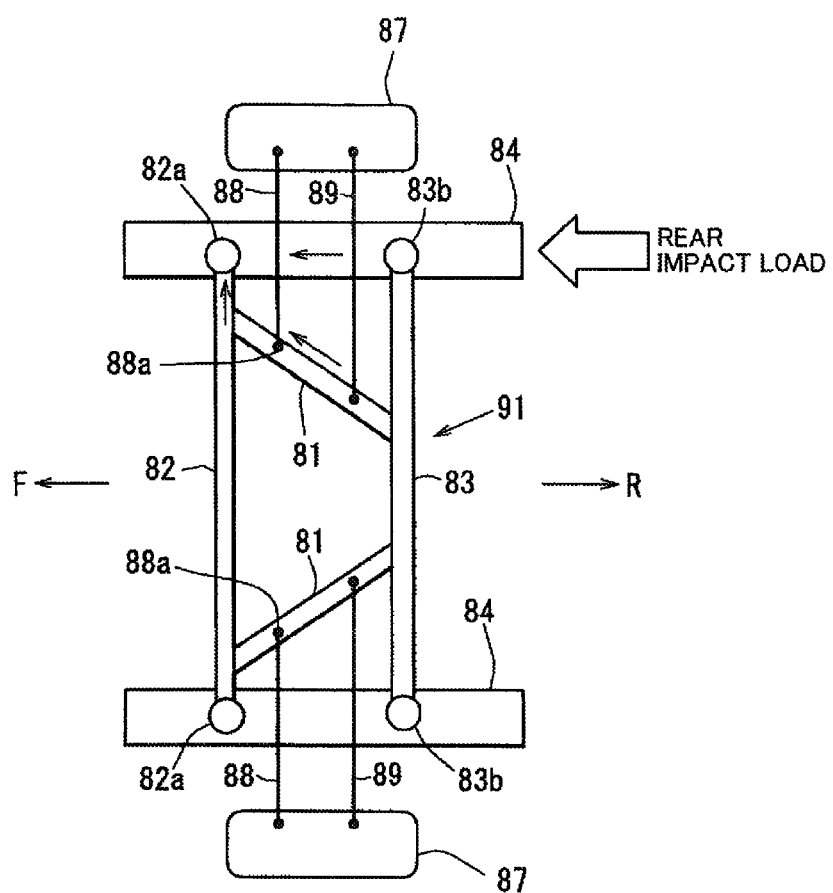
FIG. 19 is a bottom view schematically illustrating still another example of the conventional automotive rear vehicle body structure.
Figure 20:
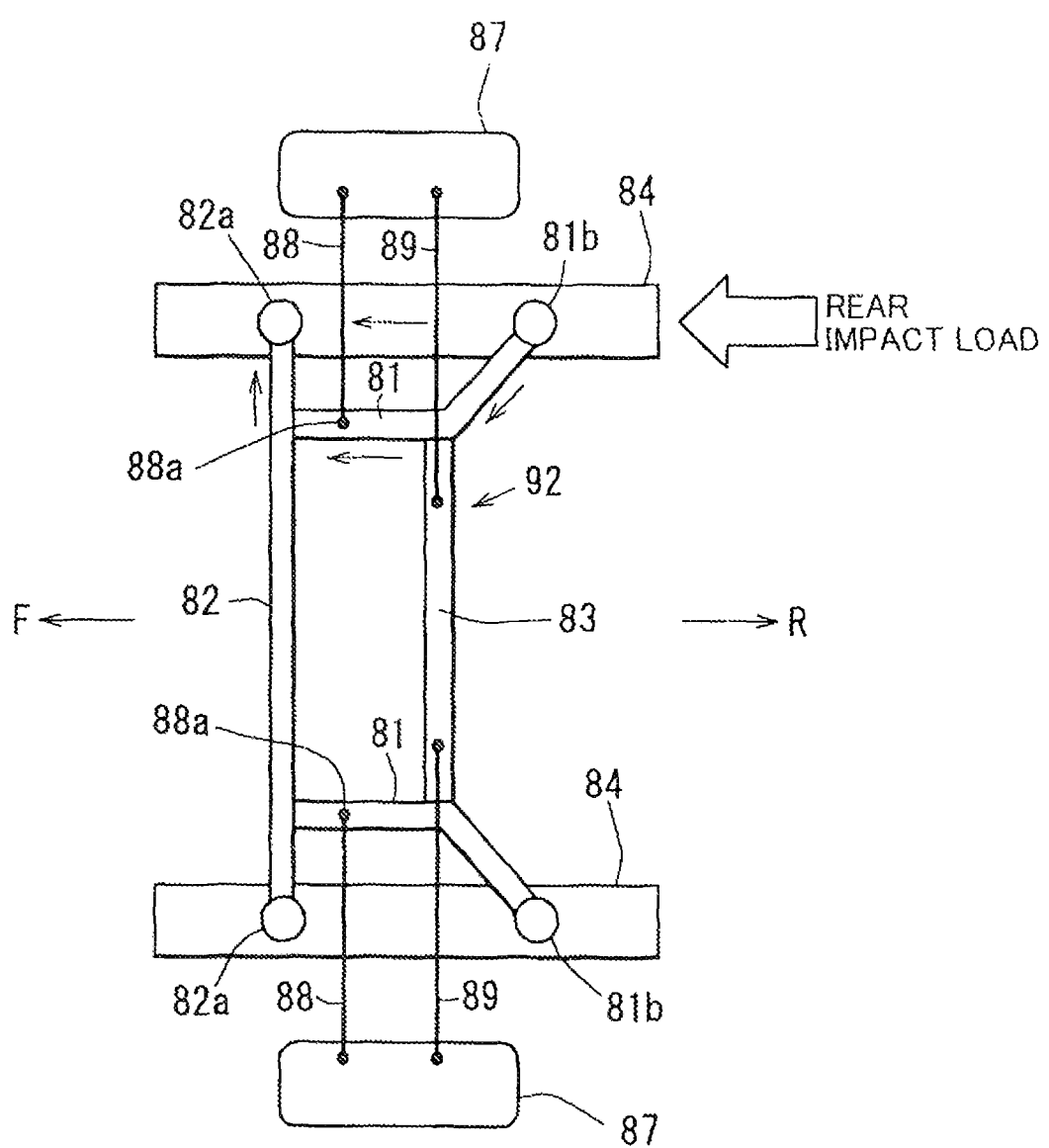
FIG. 20 is a bottom view schematically illustrating yet still another example of the conventional automotive rear vehicle body structure.

FIGS. 14 and 15 illustrate an automotive rear vehicle body structure according to another, second, embodiment of the present invention, wherein FIG. 14 is a top plan view, and FIG. 15 is a sectional view taken along the arrowed line XV-XV in FIG. 14.

In the second embodiment, in addition to the side member segments 22 and the front cross member segment 23, the rear cross member segment 24 is also formed into a pipe-like shape.

That is, the rear cross member segment 24 comprises: a central portion 24C; a forwardly-inclined portion 24F extending outwardly in the vehicle width direction and forwardly from each of opposite right and left ends of the central portion 24C; and a rearwardly-inclined portion 24R extending obliquely outwardly in the vehicle width direction and rearwardly while being branched with respect to the forwardly-inclined portion 24F. Among them, the central portion 24C and the forwardly-inclined portion 24F is integrally formed using the same pipe member, and a vehicle-widthwise outer end of the forwardly-inclined portion 24F is joined to a corresponding one of the side member segments 22 by means of continuous welding. On the other hand, the rearwardly-inclined portion 24R is formed using a pipe member different from that for the central portion 24C and the forwardly-inclined portion 24F. A vehicle-widthwise inner end of the rearwardly-inclined portion 24R is joined to a vicinity of a boundary region between the forwardly-inclined portion 24F and the central portion 24C (in the embodiment illustrated in FIG. 14, a vehicle-widthwise inner end of the forwardly-inclined portion 24F) by means of continuous welding, and a vehicle-widthwise outer end of the rearwardly-inclined portion 24R is joined to the rear end region of the corresponding one of the side member segments 22 by means of continuous welding.

A cross-sectionally approximately C-shaped bracket 51 is provided on a region where the central portion 24C, the forwardly-inclined portion 24F and the rearwardly-inclined portion 24R are joined together to form a Y shape in top plan view, in such a manner as to cover the region from thereoutside. An edge 51a of a vehicle-widthwise inner end of the bracket 51 is joined to the central portion 24C by means of continuous welding, and a front edge 51b and a rear edge 51c of a vehicle-widthwise outer end of the bracket 51 are joined, respectively, to the forwardly-inclined portion 24F and the rearwardly-inclined portion 24R by means of continuous welding.

As illustrated in FIG. 15, a pair of front and rear rear-lower-arm support pieces 51d extending downwardly are integrally provided with a lower portion of the bracket 51. A cross-sectionally angular C-shaped stiffner 41 is provided between the pair of front and rear rear-lower-arm support pieces 51d, and two attaching pieces of the stiffner 41 (two downwardly-protruding pieces provided at respective front and rear edges of the stiffner 41) are joined, respectively, to the rear-lower-arm support pieces 51d by means of welding. A rear-lower-arm support pin 52 is disposed to lay horizontally between the pair of front and rear rear-lower-arm support pieces 51d, and a vehicle-widthwise inner end of the rear arm 37 illustrated in FIG. 1 is pivotally supported by the rear-lower-arm support pin 52.

As above, in the embodiment illustrated in FIGS. 14 and 15, all of the central portion 24C, the forwardly-inclined portion 24F and the rearwardly-inclined portion 24R of the rear cross member segment 24 are formed into a pipe-like shape.

According to this feature, it becomes possible to further promote the achievement of lighter weight and higher rigidity in the rear subframe 21, and further promote the distribution of a rear impact load via the rear subframe 21.

In the embodiment illustrated in FIGS. 14 and 15, the remaining configuration, functions and effects are approximately the same as those in the aforementioned, first, embodiment. Thus, in FIGS. 14 and 15, the same element or component as that in the aforementioned figures is assigned with the same reference numeral or code, and its detailed description will be omitted.

Although some preferred embodiments of the present invention have been described based on FIGS. 1 to 15, it is to be understood that the present invention is not limited to the configurations illustrated in FIGS. 1 to 15. For example, in the above embodiments, as the front arm 32 of the rear suspension, two arms consisting of the upper arm 32A and the lower arm 32B are provided. Alternatively, either one of the arms may be omitted.

Last of all, distinctive features disclosed in the above embodiments and functions and advantageous effects based on the features will be outlined.

An automotive rear vehicle body structure comprises: right and left rear side frames; a vehicle-body cross member mutually coupling the right and left rear side frames and defining a closed cross-section in cooperation with a vehicle-body floor panel; and a rear subframe for supporting a rear suspension. The rear subframe has right and left side member segments, and front and rear cross member segments each mutually coupling the right and left side member segments. Each of the right and left side member segments has a rear region provided with a rear fixing section attached to a respective one of the right and left rear side frames, and a front region provided with a front fixing section attached to the vehicle-body cross member. A position of the front fixing section of each of the side member segments is set to be located inward of the respective one of the rear side frames in a vehicle width direction, and each of the side member segments is provided with an arm support section at a position rearward of the front fixing section, wherein the arm support section is configured to pivotally support a suspension arm of the rear suspension.

According to this feature, the front fixing section of each of the right and left side member segments is attached to the vehicle-body cross member (i.e., a vehicle-body component member located inward of a respective one of the rear side frames in the vehicle width direction) mutually coupling the right and left rear side frames. Thus, as compared to a structure in which the front fixing section is attached to the rear side frame, a distance in the vehicle width direction between the arm support section and the front fixing section provided in each of the side member segments becomes shorter, and an arm length of the front arm becomes longer. This makes it possible to enhance rigidity of the rear subframe without providing an additional member such as a reinforcing member, thereby achieving lighter weight and higher rigidity in the rear subframe. In addition, the arm length can be sufficiently ensured, so that it becomes possible to effectively prevent a change in suspension geometry (change in toe angle, etc.).

In the event of a vehicle rear collision, a rear impact load received by a rear region of the rear side frame is transmitted to the vehicle-body cross member via the side member segment, and then distributed from the vehicle-body cross member to a member other than the rear side frame, such as a vehicle-body floor panel. In this way, the distribution of a rear impact load can be promoted, so that it becomes possible to suppress forward displacement of the rear subframe and deformation of a vehicle-body member located forward of the rear subframe, due to the rear impact load, and further enhance rear impact safety.

Preferably, in the above body structure, the rear cross member segment comprises: a central portion located forward of the rear fixing section of each of the side member segments; a rearwardly-inclined portion extending from the central portion obliquely toward the rear fixing section of each of the side member segments; and a forwardly-inclined portion extending outwardly in the vehicle width direction and forwardly while being branched with respect to the rearwardly-inclined portion. The central portion of the rear cross member segment is provided with two rear arm support sections at right and left portions thereof, wherein each of the rear arm support sections is configured to pivotally support a rear arm located rearward of the suspension arm.

According to this feature, a truss structure is formed by the three components: the rearwardly-inclined portion and the forwardly-inclined portion of the rear cross member segment, and the side member segment. The truss structure can efficiently reinforce the rear cross member segment and thus the side member segment, so that it becomes possible to enhance support rigidity for the rear arm in the front-rear direction and right-left direction while suppressing an increase in weight. In addition, a rear impact load can be effectively distributed to the vehicle-body cross member via the side member segment reinforced by the truss structure.

Preferably, in the above body structure, each of the side member segments has a region extending from the rear fixing section thereof obliquely inwardly in the vehicle width direction and forwardly, to allow a rear suspension spring to be installed forward of the oblique region.

According to this feature, it becomes possible to satisfy both of distribution of a rear impact load via the side member segment and layout of the rear suspension spring.

Preferably, in the above body structure, each of the side member segments is formed into a pipe-like shape.

According to this feature, each of the side member segments has a pipe-like shape (closed cross-section structure), so that it becomes possible to further promote the achievement of lighter weight and higher rigidity in the rear subframe and the distribution of a rear impact load.

Preferably, in the above body structure, the suspension arm comprises an upper arm, and a lower arm located below the upper arm. The arm support section comprises an upper-arm support sub-section configured to pivotally support the upper arm, and a lower-arm support sub-section configured to pivotally support the lower arm. The upper-arm support sub-section and the lower-arm support sub-section are provided at the same position in a vehicle front-rear direction.

In this way, the upper-arm support sub-section and the lower-arm support sub-section are provided at the same position in the front-rear direction. In this case, it becomes possible to suppress a vehicle-widthwise bending moment applied to the side member segment due to a lateral force, and prevent a undesirable change in suspension geometry, as compared to the case where they are different in terms of front-rear position.

Preferably, in the above vehicle body structure, all of the central portion, the forwardly-inclined portion and the rearwardly-inclined portion of the rear cross member segment are formed into a pipe-like shape.

According to this feature, it becomes possible to further promote the achievement of lighter weight and higher rigidity in the rear subframe, and further promote the distribution of a rear impact load via the rear subframe.

What is claimed is:

1. An automotive rear vehicle body structure comprising:
   right and left rear side frames; a vehicle-body cross member mutually coupling the right and left rear side frames and defining a closed cross-section in cooperation with a vehicle-body floor panel; and a rear subframe for supporting a rear suspension, wherein:
   the rear subframe has right and left side member segments, and front and rear cross member segments each mutually coupling the right and left side member segments;
   each of the right and left side member segments has a rear region provided with a rear fixing section attached to a respective one of the right and left rear side frames, and a front region provided with a front fixing section attached to the vehicle-body cross member;
   a position of the front fixing section of each of the side member segments is set to be located inward of the respective one of the rear side frames in a vehicle width direction;
   each of the side member segments is provided with an arm support section at a position rearward of the front fixing section, the arm support section being configured to pivotally support a suspension arm of the rear suspension;
   the rear cross member segment comprises a central portion located forward of the rear fixing section of each of the side member segments, a rearwardly-inclined portion extending from the central portion obliquely toward the rear fixing section of each of the side member segments, and a forwardly-inclined portion extending outwardly in the vehicle width direction and forwardly while being branched with respect to the rearwardly-inclined portion; and
   the central portion of the rear cross member segment is provided with two rear arm support sections at right and left portions thereof, each of the rear arm support sections being configured to pivotally support a rear arm located rearward of the suspension arm.

2. The automotive rear vehicle body structure as defined in claim 1, wherein each of the side member segments has a region extending from the rear fixing section thereof obliquely inwardly in the vehicle width direction and forwardly, to allow a rear suspension spring to be installed forward of the oblique region.

3. The automotive rear vehicle body structure as defined in claim 1, wherein each of the side member segments is formed into a pipe-like shape.

4. The automotive rear vehicle body structure as defined in claim 1, wherein the suspension arm comprises an upper arm, and a lower arm located below the upper arm, and wherein the arm support section comprises an upper-arm support sub-section configured to pivotally support the upper arm, and a lower-arm support sub-section configured to pivotally support the lower arm, the upper-arm support sub-section and the lower-arm support sub-section being provided at the same position in a vehicle front-rear direction.

5. The automotive rear vehicle body structure as defined in claim 1, wherein all of the central portion, the forwardly-inclined portion and the rearwardly-inclined portion of the rear cross member segment are formed into a pipe-like shape.

6. The automotive rear vehicle body structure as defined in claim 2, wherein each of the side member segments is formed into a pipe-like shape.

7. The automotive rear vehicle body structure as defined in claim 3, wherein all of the central portion, the forwardly-inclined portion and the rearwardly-inclined portion of the rear cross member segment are formed into a pipe-like shape.

* * * * *